T. WIDDOP.
TIRE.
APPLICATION FILED MAR. 22, 1919.

1,331,606.

Patented Feb. 24, 1920.
2 SHEETS—SHEET 2.

Witness
F. B. Woodew.

T. Widdop, Inventor

By C. A. Snow & Co.
Attorneys

UNITED STATES PATENT OFFICE.

THOMAS WIDDOP, OF OGDEN, UTAH.

TIRE.

1,331,606.

Specification of Letters Patent.

Patented Feb. 24, 1920.

Application filed March 22, 1919. Serial No. 284,261.

*To all whom it may concern:*

Be it known that I, THOMAS WIDDOP, a citizen of the United States, residing at Ogden, in the county of Weber and State of Utah, have invented a new and useful Tire, of which the following is a specification.

This invention relates to improvements in tires, the primary object of the invention being to provide a tire in which inflation is unnecessary and a resilient, one-piece coil member used in place thereof for maintaining the tire in expanded condition thereby to afford the necessary resiliency.

A further object of the invention is the provision of a tire of the character set forth having improved means for securing the tire on the rim of a vehicle wheel.

With these and other objects in view, which will appear as the description proceeds, the invention consist in the novel features of construction and combination of parts which will be more fully described hereinafter and particularly pointed out in the claims.

In the drawings accompanying and forming a part of this specification,

The same characters of reference designate the same parts in the different figures of the drawings.

In the embodiment of the invention herein illustrated, 2 designates a wooden felly, 3 a demountable rim having the usual flanges adapted to engage and hold the beads usually formed on the outer casing 4 of a tire, all of which are in common use in connection with automobile wheels. The parts 2 and 3 constitute a wheel body.

As hereinbefore stated, the primary object of the present invention is to provide improved means for maintaining the tire in expanded condition without inflating the same. As herein shown, this means comprises a coil member 5 formed of a plurality of overlapping layers of a resilient spring material extending circumferentially of the wheel within the tire. This coil member is preferably formed from a continuous strip of steel or other suitable material coiled upon itself so as to form four or five layers, or more, whereby a jointless expanding coil is provided which possesses the required strength and tension to sustain the weight ordinarily placed on the tires of an automobile and maintain such tires in an expanded condition and at the same time being sufficiently resilient to meet all the requirements of the ordinary pneumatic tire, and which coil will not contract, but, on the contrary, continually tends to automatically expand the tire to compensate for wear or expansion of the tire casing by heat or other causes.

Figure 2:
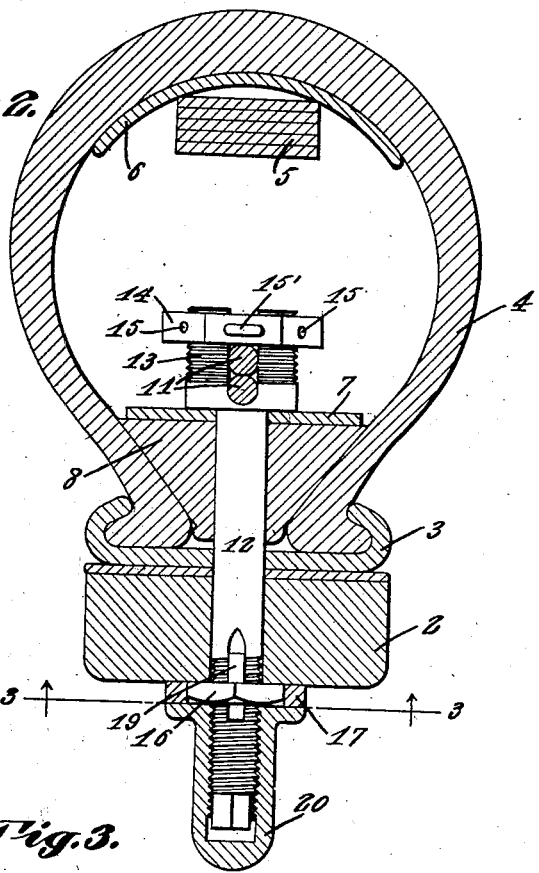
Fig. 2 is a cross-sectional view on an enlarged scale, taken on the line 2—2 of Fig. 1.
Figure 3:
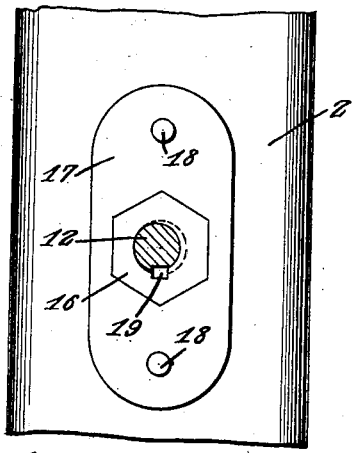
Fig. 3 is a sectional view taken on the line 3—3 of Fig. 2, looking in the direction of the arrows.

For preventing wear of the tire casing against the edges of the coil above described, I provide a shield 6, shaped so as to conform to the shape of the casing. This shield is preferably made of pressed steel and is located, as shown in Fig. 2, between the coil 5 and the casing 4 of the tire, the meeting ends of the shield being shaped so as to provide an ordinary form of lap joint, (not shown). By this means the coil 5 is maintained out of direct contact with the casing so as to prevent injury thereto.

I am aware that attempts have been made to provide a tire that is expanded by means of a spring extending circumferentially thereof, but such attempts with which I am familiar have been unsuccessful for the reason that a ring band was formed of a single strip of metal having two ends joined together by a bolt and washer or similar means, and the band would invariably break at the joint. In the present improvement, however, there is no such joint, since the band is formed of a coil having a plurality of layers whereby the use of a joint is entirely unnecessary. Moreover, in the form herein described, the same expanding member may be used for tires of different sizes within a far greater range than devices of this kind heretofore provided.

Figure 1:
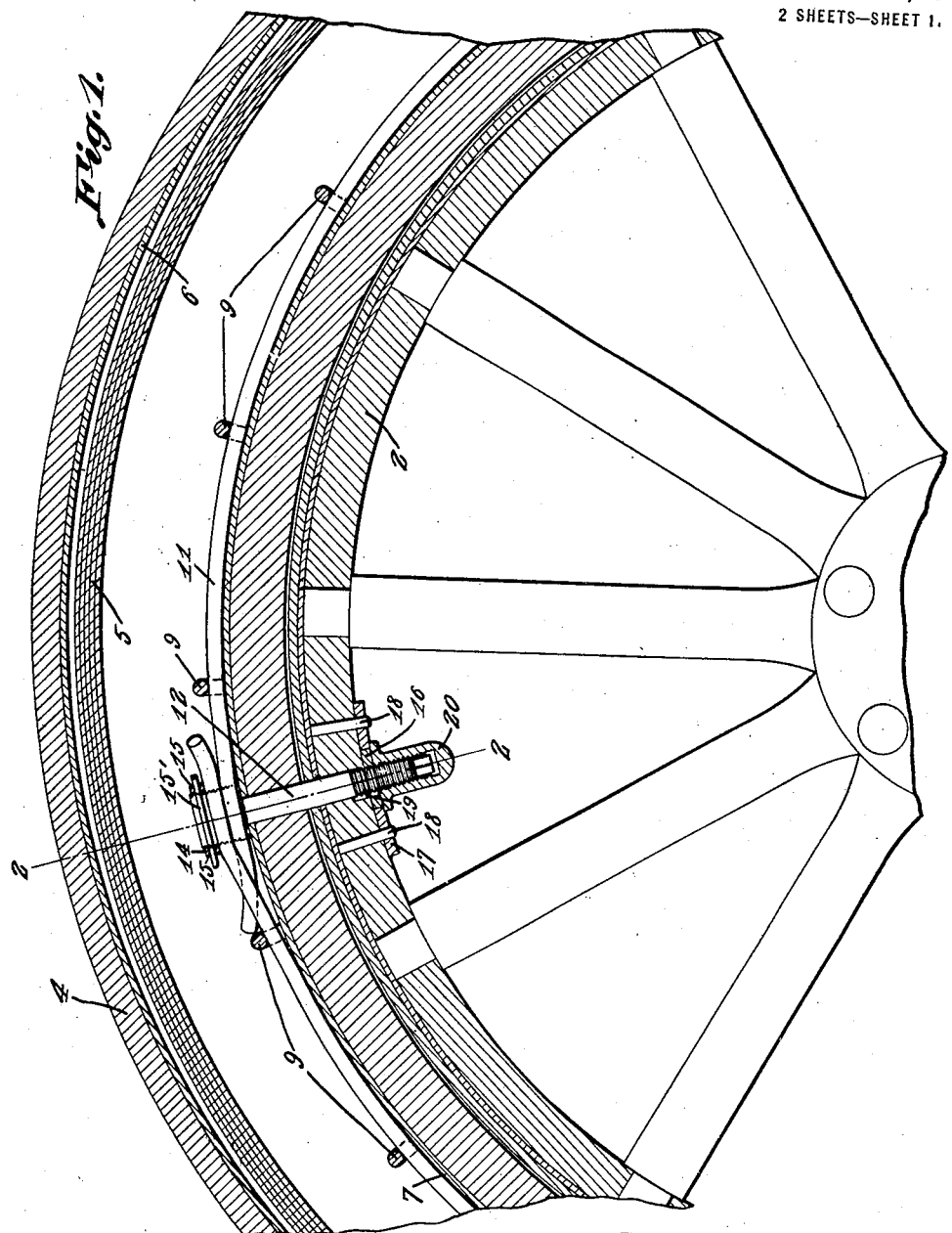
Figure 1 is a longitudinal sectional view illustrating the device forming the subject matter of this application mounted on a wheel, a portion of the wheel appearing in elevation.
Figure 4:
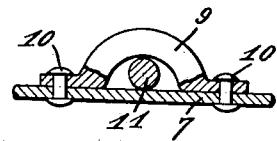
Fig. 4 is a sectional view, partly broken away, illustrating the means for retaining the cable centrally in place on the metal band.

In the use of a tire such as above described, since the inflation of the tire is dispensed with, it is desirable to provide a means for securely locking the tire to the rim of the wheel, and in the present instance I have provided a metal band 7 adapted to extend within the tire circumferentially of the rim, a filler 8 of soft material, such as rubber or other suitable material, being inserted between the band 7 and the casing so as to protect the latter from injury by the band. The band 7, which is not in the form of a continuous ring, is provided at equally spaced points along one face thereof with a plurality of guide members 9 secured to the band in any suitable manner, as for instance by rivets 10, said guide members extending crosswise of the band and being arched at their center portion, as shown in Fig. 4, to permit the passage of a cable 11 which extends circumferentially of the band and is maintained in central relation thereto by means of such guide members. For tightening the cable and maintaining it in taut condition, I have provided a twisting bolt 12 having at its inner end an enlarged, exteriorly threaded, slotted head 13. The ends of the cable are brought together within the slot of the head 13 and a nut 14 screwed thereover, said nut being provided with openings 15 for the reception of cotter pins 15' to prevent the nut from turning loose on the head 13. As will be seen from Figs. 1 and 2, the bolt 12 passes through the band 7, the filler 8 and through the opening usually provided in the demountable rim and felly of the wheel for the reception of the valve stem of a pneumatic tire, and has threaded on its outer end a nut 16, the extreme outer end of the bolt being squared to permit the use of a wrench for turning the bolt. A keeper plate 17, having an opening at the center thereof adapted to fit the nut 16, is provided for retaining the bolt 12 after it has been twisted sufficiently to tighten the cable, this keeper plate being also provided with an opening adjacent each end thereof adapted to fit over a pair of lugs 18 carried by the felly of the wheel, whereby the keeper is prevented from turning on the bolt. The bolt 12 and nut 16 are also provided with registering openings adapted to receive a spline or key 19 for preventing relative rotation of the nut and bolt. For retaining the keeper plate 17 on the lugs 18, I provide an interiorly threaded cap 20 adapted to fit the end of the bolt 12 and having a flange which bears against the keeper plate and holds it in contact with the felly.

It is believed that the operation of the device will be clear from the foregoing. When it is desired to tighten the cable, the nut 16 is screwed on the bolt until the spline openings therein are in register and the spline 19 is dropped into place. The bolt is then turned so as to tighten the cable to the desired extent and until the opening at the center of the keeper plate registers with the nut 16 and the openings at the ends register with the lugs 18. The keeper is then dropped into position and the cap 20 screwed down tightly thereon. It will thus be seen that I have provided a tire-securing device that is particularly well adapted for use in connection with a tire in which an expanding member is used in place of inflation of the tire.

While I have described in detail the structure herein illustrated, it is to be understood that I do not thereby limit my invention to the precise features of construction shown, as I am aware that many mechanical changes may be made without departing from the spirit and scope of the invention as set forth in the appended claims.

Having thus described my invention, what I claim is:

1. The combination with a tire casing provided with means extended circumferentially thereof for expanding the casing, of means for securing said casing to the body of a vehicle wheel and including a cable extended circumferentially of the casing; a member mounted for rotation and having one end shaped to receive and hold the ends of the cable; and means for holding said member in adjusted positions.

2. The combination with a tire casing provided with means extending circumferentially thereof for expanding the casing, of means for securing said casing to the body of a vehicle wheel and including a circumferentially extending band within said casing, a cable slidably carried by said band, a member adapted to extend through said band and the body of a vehicle wheel and carrying means for gripping the ends of said cable, and means for securing said member against movement.

3. The combination with a tire casing provided with means extending circumferentially thereof for expanding the casing, of means for securing said casing to the body of a vehicle wheel, said means comprising a circumferentially extending band within said casing, a cable extending circumferentially of said band, means carried by said band for slidably maintaining said cable in central relation to the band, a bolt adapted to extend through said band and the body of a vehicle wheel and having an enlarged head within said casing adapted to receive the ends of said cable, a nut coöperating with said head for gripping the ends of the cable, and means carried by said bolt for securing it to the body of the vehicle wheel in cable holding position.

4. The combination with the body of a vehicle wheel adapted to receive a casing, of means for securing said casing to the body and comprising a cable extending circumferentially of said casing, means for twisting said cable, and means between said cable and casing for forcing the casing into contact with the body when the cable is twisted.

5. The combination with the body of a vehicle wheel adapted to receive a casing, of means for securing said casing to the body and comprising a cable extending circumferentially of said body, a band between said cable and body, a bolt extending through said band and through the body of the wheel and provided at one end with means for gripping said cable, a nut at the opposite end of said bolt, means between said nut and bolt for preventing relative rotation thereof, a plate provided with an opening adapted to fit said nut, and coöperating means carried by said plate and the body for preventing rotation of said plate.

In testimony that I claim the foregoing as my own, I have hereto affixed my signature in the presence of two witnesses.

THOMAS WIDDOP.

Witnesses:
  G. F. MULLER,
  B. F. JOHNSTON.